United States Patent
Tamir et al.

(10) Patent No.: US 11,348,255 B2
(45) Date of Patent: May 31, 2022

(54) TECHNIQUES FOR OBJECT TRACKING

(71) Applicant: Track160, Ltd., Petach Tiqva (IL)

(72) Inventors: Michael Tamir, Tel Aviv (IL); Michael Birnboim, Holon (IL); Antonio Dello Iacono, Tel Aviv (IL); Yaacov Chernoi, Petah Tikva (IL); Tamir Anavi, Kfar Saba (IL); Michael Priven, Ramat Gan (IL); Alexander Yudashkin, Tel Aviv (IL)

(73) Assignee: Track160, Ltd., Petach Tiqva (IL)

(*) Notice: Subject to any disclaimer, the term of this patent is extended or adjusted under 35 U.S.C. 154(b) by 491 days.

(21) Appl. No.: 15/997,189

(22) Filed: Jun. 4, 2018

(65) Prior Publication Data
US 2018/0350084 A1    Dec. 6, 2018

Related U.S. Application Data

(60) Provisional application No. 62/515,194, filed on Jun. 5, 2017.

(51) Int. Cl.
*G06T 7/00* (2017.01)
*G06T 7/20* (2017.01)
(Continued)

(52) U.S. Cl.
CPC ............... *G06T 7/292* (2017.01); *G06T 7/20* (2013.01); *G06T 7/70* (2017.01);
(Continued)

(58) Field of Classification Search
None
See application file for complete search history.

(56) References Cited

U.S. PATENT DOCUMENTS

| 7,602,301 B1 | 10/2009 | Stirling et al. |
| 2003/0099375 A1* | 5/2003 | Sefcik ............... G08B 13/19602 382/103 |

(Continued)

FOREIGN PATENT DOCUMENTS

EP      2150057 A2     2/2010

OTHER PUBLICATIONS

International Search Report and Written Opinion of International Searching Authority for PCT/US2018/036055, ISA/RU, Moscow, Russia, dated Oct. 18, 2018.

(Continued)

*Primary Examiner* — Matthew C Bella
*Assistant Examiner* — Brian D Shin
(74) *Attorney, Agent, or Firm* — M&B IP Analysts, LLC

(57) ABSTRACT

A method and system for tracking movements of objects in a sports activity are provided. The method includes matching video captured by at least one camera with sensory data captured by each of a plurality of tags, wherein each of the at least one camera is deployed in proximity to a monitored area, wherein each of the plurality of tags is disposed on an object of a plurality of monitored objects moving within the monitored area; and determining, based on the video and sensory data, at least one performance profile for each of the monitored objects, wherein each performance profile is determined based on positions of the respective monitored object moving within the monitored area.

39 Claims, 4 Drawing Sheets

(51) Int. Cl.
*G06T 7/292* (2017.01)
*G06T 7/70* (2017.01)

(52) U.S. Cl.
CPC ............ *G06T 2207/20081* (2013.01); *G06T 2207/30196* (2013.01); *G06T 2207/30221* (2013.01); *G06T 2207/30224* (2013.01); *G06T 2207/30228* (2013.01)

(56) References Cited

U.S. PATENT DOCUMENTS

| | | | | |
|---|---|---|---|---|
| 2008/0192116 | A1* | 8/2008 | Tamir | G06T 7/292 348/157 |
| 2009/0210078 | A1* | 8/2009 | Crowley | G06F 7/00 700/91 |
| 2010/0184563 | A1* | 7/2010 | Molyneux | A43B 1/0054 482/1 |
| 2010/0194879 | A1* | 8/2010 | Pasveer | A63B 24/0006 348/135 |
| 2013/0063558 | A1 | 3/2013 | Phipps | |
| 2015/0324636 | A1 | 11/2015 | Bentley et al. | |
| 2016/0307335 | A1 | 10/2016 | Perry et al. | |

OTHER PUBLICATIONS

Teixeira, et al., "PREM-ID: Identifying People by Gait-Matching using Cameras and Wearable Accelerometers" Third ACM/IEEE International Conference, Aug. 30, 2009, pp. 1-8.

Teixeira, et al., "Tasking Networked CCTV Cameras and Mobile Phones to Identify and Localize Multiple People", Proceedings of the 12th ACM International conference on Ubiquitous Computing: UBICOMP 10, ACM Press, New York, Sep. 26, 2010.

The European Search Report for European Application No. 18814199.8, dated Jan. 29, 2021, EPO, Munich, Germany.

* cited by examiner

TECHNIQUES FOR OBJECT TRACKING

CROSS-REFERENCE TO RELATED APPLICATIONS

This application claims the benefit of U.S. Provisional Application No. 62/515,194 filed on Jun. 5, 2017, the contents of which are hereby incorporated by reference.

TECHNICAL FIELD

The present disclosure relates generally to activity tracking, and more particularly to tracking movements of objects in sports activities.

BACKGROUND

Coaches, managers, players, and other people involved in sports and other physical activities often seek to extract and record data representing performance of players in a game review conducted during or after the game. Specifically, such sports-related people often seek information regarding player positions and derived parameters throughout a game to evaluate performance with respect to aspects of sports such as player progress, advantages, deficiencies, suitability for a given role, team tactics, and the like. Review of player performance is often used for both professional and amateur athletes.

This information may also be particularly useful for preventing injuries. For professional teams, injuries often result in the equivalent of between 10-30% of team payroll wasted due to inability of one or more players to compete. The estimated average cost of player injuries in the top 4 professional soccer leagues in 2015 was 12.4 million USD per team. Further, in the United States, only about 1.35 million youths suffer annually from serious sports injuries. As such, injuries have a damaging effect on recreational sport players, causing amateur players to miss school or work.

Existing solutions to analyze and review player or team performance are based on collecting parameters related to players and ball positions on the playing field throughout the match. Parameters on players' movements such as player speeds, sprints, dribbles, accumulated distances and stress, as well as team tactics performance, can be extracted from the dynamic positions of the players and/or balls on the playing field. To this end, various player-tracking solutions have been developed. While such tools may be worthwhile for sports professionals, such solutions are often expensive or otherwise unsuitable for non-professional sports such as school sports, and casual leagues, and groups of friends.

One existing solution for tracking player activities utilizes several high-resolution cameras to capture various zones of a sports area (e.g., a field). Typically, the video outputs of such cameras are stitched together and object tracking methods are then employed to track the players and/or the ball. An optical tracking system may also be used to track the ball in addition to players and referees. The ball's location data enables extraction of more players and team performance parameters such as dribbling stats, headers, scores and team tactics.

Such video tracking solutions lose track of the players when two or more players come in close physical proximity or otherwise occlude one another. Further, even once these video tracking solutions are able to resume tracking (i.e., once the players have separated again), the tracker will be unable to distinguish among identities of players. Consequently, existing solutions require use of a human operator to at least recognize players and note their identities after each proximity-related incident. However, use of a human operator is often impractical, particularly for amateur teams and players. Further, even for professional teams, use of human operators introduces human errors.

Another existing solution utilizes global positioning system (GPS) and inertial sensors located on players to determine each player's position at various points in time. Signals from the GPS and inertial sensors may be collected and analyzed. A major deficiency of the GPS-based solutions is that such solutions cannot track objects (e.g., a ball) that the GPS is not mounted on. In addition, such solutions cannot accurately determine the locations of the players relative to each other.

GPS-based solutions are expensive due at least in part to the GPS receiver cost. Also, such a receiver is relatively heavy and bulky and, therefore, unwieldy, particularly for young players. Additionally, many GPS-based solutions face challenges in indoor tracking, as some solutions cannot function properly indoors. Although some solutions for utilizing GPS-based tracking indoors exist, such solutions face further challenges in cost and logistics. Finally, the GPS signals are often inaccurate, particularly when compared to optical methods. Thus, the accuracy may not be sufficient to extract player positions relative to each other.

Moreover, some existing solutions utilize inertial sensors without a GPS receiver in order to track movements. Such solutions allow for determination of at least some speed and location data, but are often subject to accumulated errors and, thus, must be reset frequently as position data becomes less reliable in a matter of seconds.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method and system for A method for tracking movements of objects in a sports activity. The method comprising matching video captured by at least one camera with sensory data captured by each of a plurality of tags, wherein each of the at least one camera is deployed in proximity to a monitored area, wherein each of the plurality of tags is disposed on an object of a plurality of monitored objects moving within the monitored area; and determining, based on the video and sensory data, at least one performance profile for each of the monitored objects, wherein each performance profile is determined based on positions of the respective monitored object moving within the monitored area.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
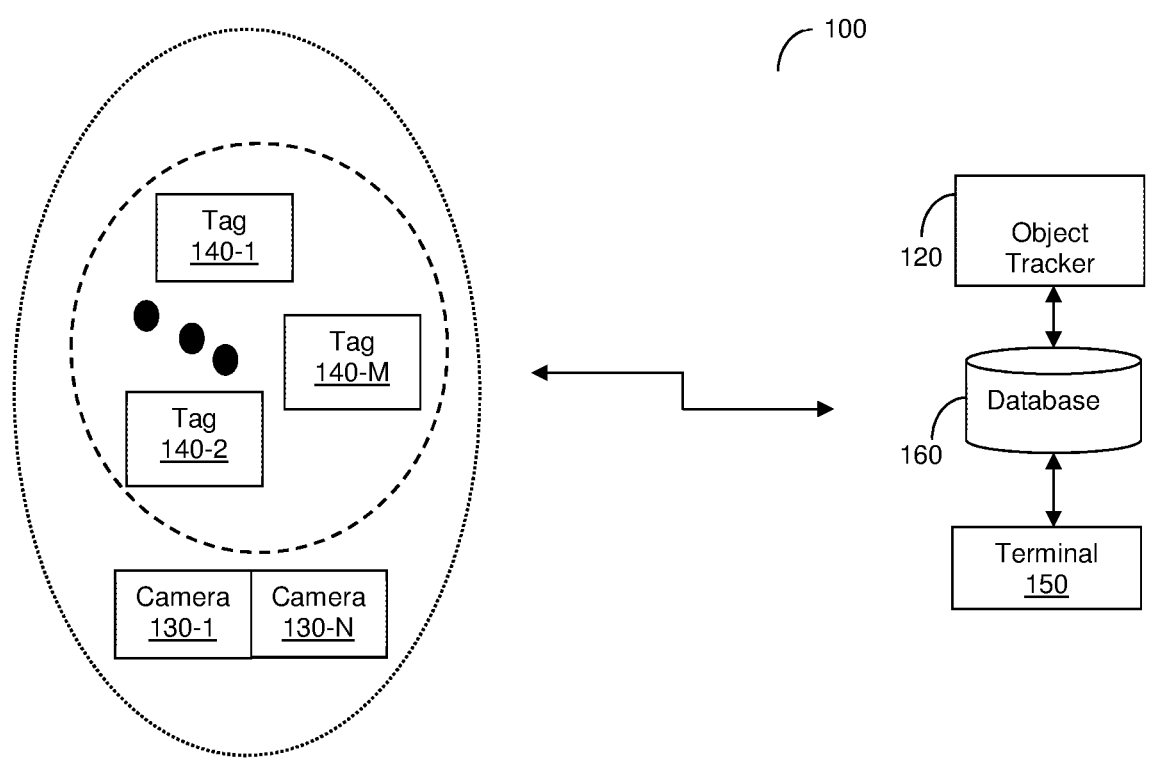
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example diagram utilized to describe an arrangement of a system 100 for object tracking according to various disclosed embodiments. The system 100 includes an object tracker 120, one or more cameras 130-1 through 130-n (hereinafter referred to individually as a camera 130 and collectively as cameras 130, merely for simplicity purposes), a plurality of tags 140-1 through 140-m (hereinafter referred to individually as a tag 140 and collectively as tags 140, merely for simplicity purposes), a terminal 150, and a database 160.

The cameras 130 are deployed in or near (e.g., within a predefined threshold distance of) a monitored area (e.g., the area 200, FIG. 2) in which moving objects are to be tracked, and are configured to capture videos of the monitored area. Specifically, the cameras 130 may be configured to capture videos featuring moving entities in the monitored area. It should be emphasized that only one camera 130 can be utilized to capture the monitored without departing from the scope of the disclosure.

Each of the tags 140 is mounted or otherwise disposed on or inside of an object in the monitored area. Each object may be, but is not limited to, a person, an item, and the like (e.g., one of the players 210 or the ball 230, FIG. 2). In an example implementation, each tag 140 may be disposed on an article of clothing of the respective object (e.g., clothes worn by a person whose movements are to be tracked). In a further example implementation, the location of the tag 140 on the respective object may be near a lower back of the respective object. In a further embodiment, each tag 140 may be integrated in a wearable device. Utilizing tags disposed in or on items such as balls may allow for, e.g., determining additional parameters related to player performance, in particular, parameters for player movements with respect to ball movements and locations.

Each tag 140 may include one or more inertial sensors including, for example, any one of or a combination of an accelerometer, a gyroscope, a magnetometer, and the like. The tag 140 may be realized using MEMS technologies. It should be emphasized that a tag 140 does not include a GPS device, thereby allowing for a cheap, compact and lightweight solution as compared to, e.g., GPS-based solutions. In an example implementation, each tag 140 may also include an embedded clock (not shown) to allow time synchronization among the tags 140.

In an embodiment, each tag 140 includes a memory (not shown) for storing sensory data collected by the one or more inertial sensors included in the tags 140. In some embodiments, each tag 140 may further include a short-range wireless communication transceiver, such as, but not limited to, BLT, Near Field Communication (NFC), ZigBee, and the like. In an optional embodiment, each tag 140 may be configured for long-range wireless communication, such as, but not limited to, Wi-Fi. In such an embodiment, the sensory data gathered by the sensors may be transmitted in real-time to the terminal 150.

In another embodiment, the terminal 150 may be configured to obtain, from the cameras 130, videos captured during a monitored time period (e.g., a period of time during which entities are moving in the monitored area such as the time of a sports game). The terminal 150 may be further configured to download or otherwise receive sensory data from the tags 140, generated based on measurements made during the monitored time period.

The terminal 150 is utilized to download data stored in each tag 140. To this end, a short-range communication channel is established between a tag 140 and a terminal 150. In another embodiment, data gathered by each tag 140 is transmitted to the terminal over the wireless network (e.g., Wi-Fi).

In a similar fashion, the terminal 150 may be configured to receive images captured by the cameras 130. In an example implementation, video captured by the cameras 130 may be directly downloaded to the terminal 150 (e.g., by directly connecting, wired or wirelessly, to the corresponding camera or sensor). As a non-limiting example, during an American football game, the cameras 130 may capture video of players running around a field and a football moving within the field, and the tags 140 may measure acceleration of the players and, optionally, the football during the game. After the game, a person collects the tags 140 from the players and inserts them into a docking station or a container adjacent to the terminal 150. The terminal 150 is configured to download the sensory data, either wirelessly or via a direct connection.

In yet another embodiment, the terminal 150 is configured to synchronize or otherwise match between images locally stored in the cameras 130 and the data locally stored in the tags 140, when downloading the data.

The downloaded data may be stored in the database 160. In an embodiment, the terminal 150 may be, but is not limited to, a personal computer, a laptop, a tablet computer, a smartphone, and the like.

According to the disclosed embodiments, in order to allow accurate tracking of objects, and particularly matching between images and sensory data, a number of synchronization processes take place before, after, or during a monitored game, or a combination thereof. A first synchronization process is to allow time synchronization among all tags 140. In an embodiment, such synchronization can be performed using an internal (embedded) clock in each tag 140. Such clocks are reset prior to the start of the game, so that the collection of sensory data of all tags 140 is with reference to the same start time.

In another embodiment, when the tags 140 do not include an internal clock, the synchronization is performed using accelerometer signals generated in response to a manual action by an operator of the terminal (not the player wearing the tags). For example, the tags 140 can be shaken to generate accelerometer signals that have a recognizable pattern. Such manual action can be performed before and after the game so that the respective recognizable patterns determine start and end actions. The tags 140 can be time synchronized across such patterns.

A second synchronization process is the frame synchronization among the cameras 130. This can be achieved using known techniques, such as an electrical cable triggering the cameras 130 or by identifying similar objects taken by different cameras 130 in an overlap area. In an embodiment, the frame synchronization among the cameras 130 is performed by analyzing the audio of video frames. Frames demonstrating the same or similar audio would be considered synchronized frames.

In yet another embodiment, in addition to the frame synchronization, the cameras 130 should be calibrated so as to provide mapping between the picture and a "real world" measurement. For example, the calibration would allow for providing an actual distance value (e.g., 1 meter) per pixel at different angles.

Another synchronization process is among the tags 140 and the cameras 130, so that the images can be matched with the sensory data to generate the performance profile according to some disclosed embodiments. The synchronization can be performed prior to a game by "stimulating" an action that would be simultaneously captured by a camera 130 and recorded at a tag 140. For example, a person (e.g., an operator of the system) can jump in front of a camera and sensory data associated with the jump would be recorded in the tag. This action would allow post-game matching between the image and sensory data.

In an embodiment, the object tracker 120 is configured to receive, from the terminal 150, the video and sensory data. Based on the received video and sensory data, the object tracker 120 is configured to generate a performance profile for at least one monitored object (e.g., one or more players). The performance profile may include for example, statistics (e.g., related to the particular sport), game events (e.g., score a field goal), and the like. The performance profile may be updated with each game being played, monitored over time, or both. The performance profile generated for an object may be further analyzed to provide comparison to other objects, injury prediction and prevention, performance prediction, scouting data, and so on.

In an embodiment, in order to generate a performance profile for each player object, the object tracker 120 may be configured to track and record the position and actions of objects based on analysis of the captured sensory data and captured video. In areas or otherwise at times where a unique visual of an object is not available, the position of the object may be determined based on acceleration sensory data collected by the accelerometers, gyros, and magnetometers of the tag 140 disposed on the object. In an embodiment, the position may be determined based on double integrating acceleration, over acceleration data corresponding to each player object, to determine changes in position of the player object.

In yet another embodiment, the identities of the entities are automatically determined by matching profiles generated based on inertial sensors of the tags 140 to profiles based on optical data captured by the cameras 130. The inertial sensor profiles may include or be based on, but are not limited to: linear acceleration, angular speed, speed magnitude, speed direction, position vector, position value at a given time, or a combination thereof. The identity of each object may be indicated in a memory of a respective tag 140 deployed in or on the object. Thus, in some implementations, the inertial sensor data from the tags 140 may be utilized to determine object positions even when optical data does not allow for such determination. In some other implementations, the players' IDs are conveyed to the terminal 150 using the profile matching technique described above.

In yet another embodiment, when tracking of the objects is lost, e.g., following occlusion or in close proximity situations, the objects' identifiers are determined based on the 2D or 3D poses of the players and their gait properties extracted from the videos captured by the cameras 130. The extracted identifiers are compared to the same properties measured by the tags 140. The gait properties include, for example, timing of a player's steps, pace of a player's steps, or both. The direction may be, for example, the direction in which the torso of the player is moving.

By matching the optical data with the sensory data, the objects' identities can be extracted (e.g., identities of players). Then, the respective tag's IDs can be associated with each object, using the extracted object's identifier. For example, a change of a player's motion direction at a given time is extracted from the captured video and associated with a velocity direction change measured by the inertial sensors worn by the player. Thus, the player's tag ID is now used by the object tracker as the player's identifier.

In yet another embodiment, dead reckoning techniques can be used to determine the objects' positions when they are either occluded from view of the cameras 130 or when they are in a collision event and cannot be separated optically. According to such techniques, a subsequent position may be determined based on a number of steps (e.g., as indicated by signals captured by sensors of the tags 140) of the object and its previous position. In a further embodiment, determining the subsequent position may include determining a length and direction of each step. The length and direction of each step can be determined using analysis of the profiles generated based on the inertial sensors of the tags 140 using, e.g., double integration over the step duration time of linear and angular accelerations. The temporal drift associated with this process is minimal with respect to the short step time duration. The length and direction of the object's steps when occluded from the camera can also be determined using extrapolation of the object's speed as determined based on images captured by the cameras 130 before entering the occlusion situation and assigning a step length figure based on this speed.

In yet another embodiment, the objects' positions throughout the event are determined using inertial sensors devices included in the tags 140 without any camera by using the dead reckoning technique described herein above in combination with step lengths and directions determined based on an analysis of the temporal acceleration data and double integration during the step duration or other methods to estimate the step length and direction.

In yet another embodiment, the object tracker 120 may be configured to determine the object ID using methods such as, but not limited to, machine vision, artificial intelligence, deep learning techniques, or a combination thereof, based on video captured by the cameras 130. The features used by a machine vision system may include, but are not limited to, images of a torso of a player, a jersey's number of a player, common gestures, "heat map" (indicating probabilities of a player object being in a certain position of the monitored area), and the like. In a further embodiment, when an object's position cannot be determined due to, e.g., occlusion, the monitored objects may be identified via analysis using a model trained with respect to the above-noted features. In yet a further embodiment, the objects may be identified without inertial sensors.

In yet another embodiment, the objects' positions when they are occluded from view of the cameras 130 are determined based on the 2D or 3D poses of the players, thereby deterministically identifying the position of each object. To this end, the gait properties and the direction (i.e., the direction in which the player is heading) of each player are determined based on the sensory data. The gait properties include, for example, timing of a player's steps, pace of a player's steps, or both. The direction may be, for example, the direction in which the torso of the player is moving.

The pose of each player is estimated based on video captured by a camera on a single location or a number of cameras from multiple locations. Specifically, the pose estimation is based on each player's skeleton rendered in response to the captured video. The rendered skeletons are analyzed to extract the features including the gait and direction of a player. The extracted features are matched to tracked gait properties and directions to uniquely identify each player.

It should be emphasized that, in some implementations, only the estimated poses of players can be used to uniquely track and identify players.

In this embodiment, when the video tracker is losing track of an entity, the ID of objects exiting the occlusion/collision situation is not determined by the sensors but rather by such a machine vision or deep learning method. The ID determination can be performed at a later time, in which case the objects' trajectories are calculated backwards to the occlusion event. In this embodiment, there is no need for the sensors (tags). As such, the system may include only the cameras and the processing device. Tracking and player ID determination may be performed automatically without an operator.

In an embodiment, the deep learning method can be achieved by means of categorized supervised learning using labeled data. In that case, a person manually identifies the player at a given time before, during, or after the game, and the manual identifications of players are used as labels for training a model. In another embodiment, in order to avoid such a human task, unsupervised learning may be utilized. This method works with unlabeled data and there is no feedback provided from the environment. The goal in this method is to group unlabeled data vectors that are close in some predetermined or learned sense. In that case matching a player name with one of the "optical classified players" might happen once per many games and is stored in the database. In this embodiment, the dynamic positions and identification of the players can be determined using a single camera in one location, an array of cameras covering the field in one location, with multiple cameras from multiple locations, or a combination thereof.

In a further embodiment, the object tracker 120 may be configured to train a model using captured camera inputs. The model may be, but is not limited to, a model for determining probabilistic positions; a model for identifying players (e.g., after players are removed from view or clustered) using their jersey numbers, clothing textures, gait analysis, etc.; and the like.

In another embodiment, the object tracker 120 is configured to track and determine the 3D movement of some of the objects that do not have one or more of the tags 140 disposed thereon or therein. The dynamic 3D positions of the objects can be determined using a single camera in one location, an array of cameras covering the field in one location, using with multiple cameras from multiple locations, or a combination thereof. In a particular example, such an object is a ball. The ball location, at any given moment, is determined based on the analysis of video captured by the cameras 130. If the ball is not seen or identified in a particular frame or a sequence of frames, the ball movement path from one location to another location (both locations are identified prior and post the invisible period) can be computed. For example, if a player A throws a ball that is being caught by a player B, and the locations of both players are known, the path of the ball between these locations can be estimated using a ballistic, motion, or other assumption.

In an embodiment, the 3D location (position) of a tag-less object (e.g., a ball) is determined. The 3D location is determined using images captured by a plurality of cameras 130 based on triangulation on the distances among the plurality of cameras 130. In yet another implementation, the 3D location of the object (ball) can be estimated using linearity of the ball's trajectory, the ball's size, and ballistic or other motion assumptions for the ball. The 3D location is needed to compute statistical parameters related to the motion of the ball. For example, such parameters may be related to dribbling, successful passes, shots on goals, and so on.

It should be noted that the tags 140 may be attached only to players belonging to the home team, while players of the guest team and the referees may not carry the tags 140. In a further example, movements and positions of players without the tags 140 may not be determined.

In an embodiment, the object tracker 120 may be configured to synchronize between inputs captured by the cameras 130 with inputs captured by sensors of the tags 140. The object tracker 120 may be further configured to synchronize between the camera inputs and the tag sensor inputs based on a plurality of features, such as acceleration, velocity, heading, gait, of players, objects (e.g., balls), or both. In yet a further embodiment, the synchronization may be performed based on initial synchronization sensory data (e.g., captured prior to or at the beginning of a game), thereby allowing for more accurate tracking of positions of entities, e.g., during the rest of the game.

In an embodiment, the time synchronization between the video and a specific tag 140 is based on temporal associations between images in which entities are identified and corresponding position changes (e.g., associating each position change with a corresponding identification of an entity in an image with respect to time of measuring and capturing, respectively). In another embodiment, a time of an internal clock of the tag may be matched to a clock of the object tracker 120, e.g., when tag data is read.

In an embodiment, based on the determined positions and the collected sensory data, the object tracker 120 is configured to generate the performance profiles. The object tracker 120 may be configured to store the generated profiles, in the database 160, for subsequent use. The player profiles, team performance profiles, or both, may be accessed by a user or shared with other users and viewed to evaluate movements of each entity.

It should be noted that the generation of the performance profiles based on images as well as inertial sensory inputs may allow for more creating accurate profiles than, e.g., the profiles created using GPS based tracking methods as well as profiles created based on visual data relying on an operator to manually identify the players after occlusion.

In one configuration, the object tracker 120 may be a virtual server deployed in a cloud-computing platform. In another configuration, the object tracker 120 may be integrated with the terminal 150 as a single device. In yet another configuration, the object tracker 120 may be a stand-alone server configured to execute the processes described herein.

In an example deployment, the tags 140 and the cameras 130 are required for capturing data during an event (a game) while the terminal 150, object tracker 120, and database 160 are utilized for off line processing of the captured video and sensory data.

It should be noted that the embodiments described herein are discussed with respect to a plurality of cameras 130 merely for simplicity purposes and without limitation on the disclosed embodiments. One camera may be equally utilized without departing from the scope of the disclosure. It should be further noted that the cameras 130 are shown in FIG. 1 as being at the same or nearly the same location within the monitored area merely as an example and without limitation on the disclosed embodiments. In some implementations, the cameras 130 may be deployed at separate locations within a monitored area.

Figure 2:
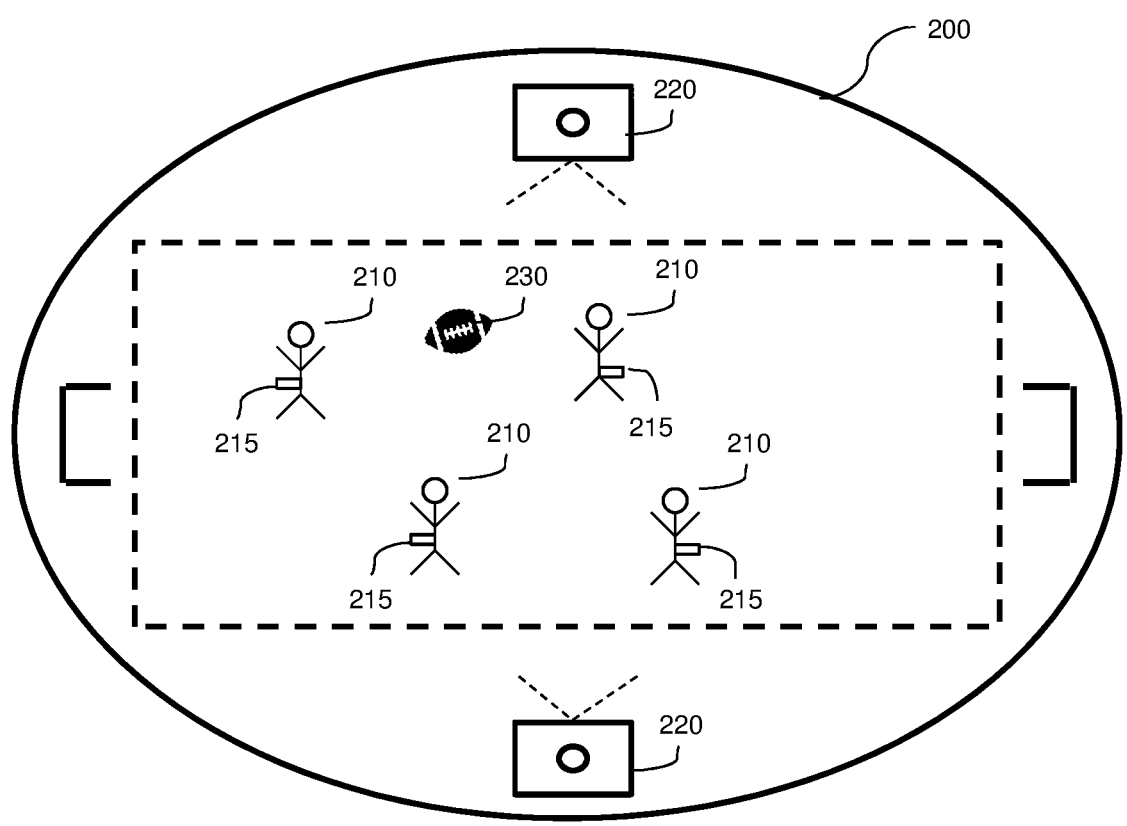
FIG. 2 is a diagram illustrating an area that may be monitored according to various disclosed embodiments.

FIG. 2 is an example diagram illustrating an area 200 which may be monitored according to various disclosed embodiments. The area 200 is monitored with respect to objects moving in the area 200, and may be monitored after completion of an event (e.g., a sports game). In an example implementation, the disclosed embodiments are utilized to monitor a sports area such as a field (e.g., a football field) in which players (e.g., soccer players) move during a sports game (e.g., an American football match).

The area 200 includes a plurality of players 210, at least one camera 220, and a ball 230. The cameras 220 are configured to capture video showing the players 210 during the game. Each player 210 has at least one tag 215. Each tag 215 generates sensor signals related to player movement during the game and is connected to the corresponding player 210 such that the position of the tag 215 is approximately the same as the position of the player 210. Each tag 215 may be disposed on the corresponding player 210 (e.g., may be affixed to the tag 215, to clothes of the player 215, and the like). As a non-limiting example, each sensor 215 is an accelerometer that measures acceleration of the respective player. The ball 230 may contain at least one tag 215, or may have disposed thereon at least one tag 215. In certain embodiments, the ball 230 does not include a tag 215 and its tracking is performed as discussed above.

It should be noted that, in an example implementation, the positions of a tag 215 and of a player 210 are approximately the same when the sensor is disposed on the player such that the position of the tag 215 is the same as the position of the portion of the player's body that is of interest for tracking. Such a position may vary depending on the activity being monitored. As a non-limiting example, for the sport soccer, running movements may be of interest for tracking such that the positions of the player's 210 torso at various points in time collectively represent the movements to be tracked. Accordingly, in an example implementation, the tag 215 may be affixed to a shirt worn by the player 210 and, specifically, may be disposed on a portion of the shirt that is adjacent to a lower back of the torso of the player 210.

During the game, the players 210 and, accordingly, the tags 215, move around the field 200. The movements of the players 210 are monitored via video captured by the cameras 220 as well as via sensor signals captured by the corresponding tags 215. The tags 215, the cameras 220, or both, may send the sensor signals and images, respectively, to an object tracker (e.g., the object tracker 120, FIG. 4). Alternatively or collectively, the tag 215, the cameras 220, or both may be configured to collect their respective data. The collected data may be uploaded by connecting the respective collecting device (e.g., by connecting each of the tags 215, the cameras 220, or both, to a user device after a game).

Figure 3:
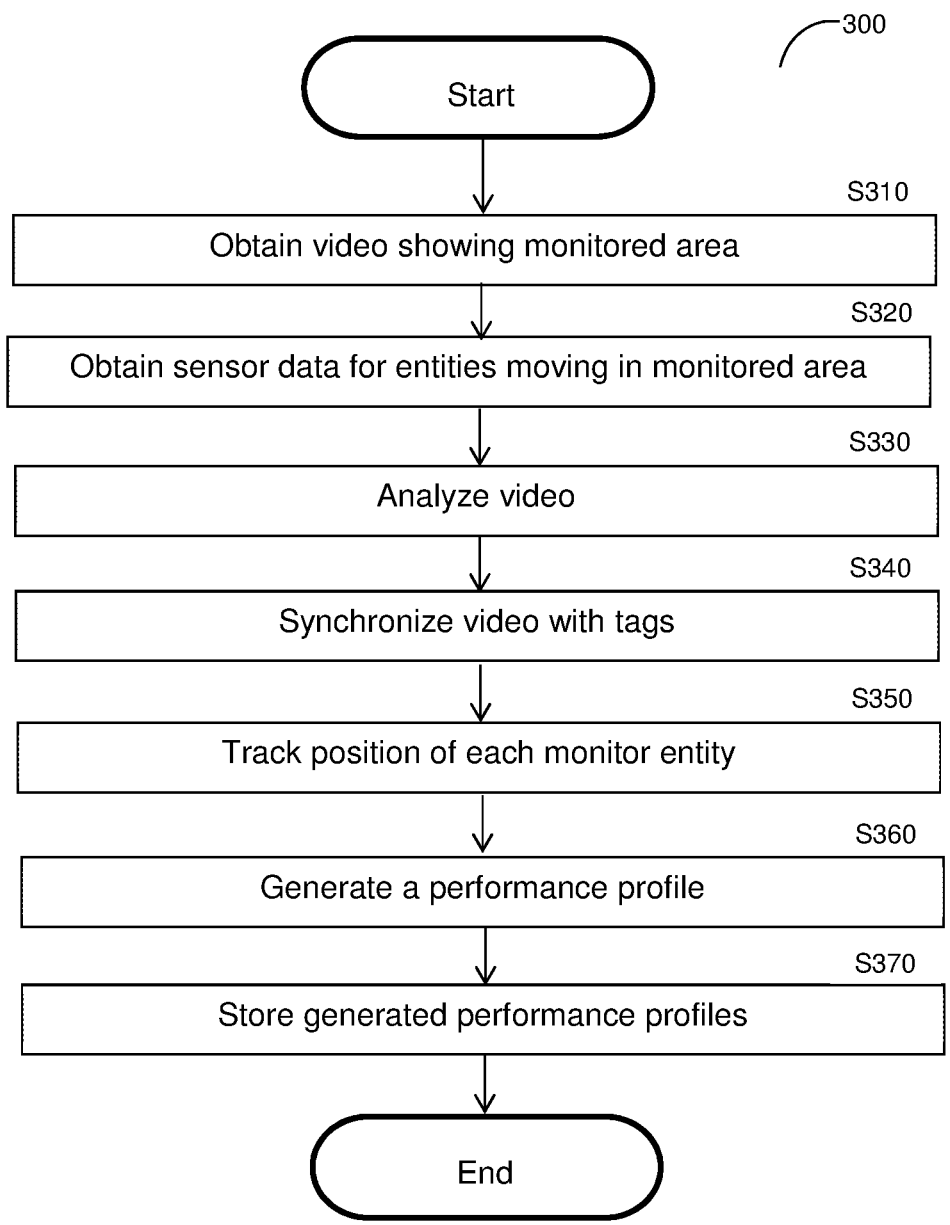
FIG. 3 is a flowchart illustrating a method for tracking entities according to an embodiment.

FIG. 3 is an example flowchart 300 illustrating a method for tracking movements of objects according to an embodiment. In an embodiment, the method may be performed by the object tracker 120. The method is performed with respect to movements of objects within a monitored area to determine positions of each object at various points during a period of monitoring. As a non-limiting example, the method may be performed with respect to movements of soccer players in a field during a game, movements of a soccer ball in the field during the game, or both.

At S310, video captured by a plurality of cameras deployed in or in proximity to the monitored area are obtained. At least a portion of the captured images features objects moving within the monitored area. The objects may be, but are not limited to, players, balls, and the like.

At S320, sensory data generated by tags deployed in or on objects moving in the monitored area are obtained. Each tag is typically disposed in or on an object, and may be affixed to the object or to an item that remains with the object during the monitored time period (for example, clothing on a soccer player).

At S330, the obtained video is analyzed. In an embodiment, the analysis may be performed using machine learning and video tracking techniques to track the entities featured in the video. Various embodiments for analyzing the video or captured video are discussed above.

At optional S340, for each monitored object, its respective tag is synchronized with the captured video. This is performed in order to match the position of each object as captured by the video with the position of the tag disposed on the object.

At S350, for each synchronized object, its position is tracked based on the captured video or the sensory data. Specifically, when the specific position of the monitored object can be uniquely obtained from the video, then the video is used as the source of the tracked position. Otherwise, the position is tracked using sensory data based on the analysis of such data. The analysis may include, but is not limited to, determining the position changes based on velocity, acceleration, or a combination thereof. For example, the analysis may include dead reckoning techniques as well as double integrating acceleration values, wherein the position changes are determined based on the integration.

At S360, for each object, a performance profile may be generated. The profile may include, but is not limited to, the tracked positions at each second, velocity values, and acceleration values based on the sensory data as gathered by the tags. Alternatively or collectively, the profile may include performance parameters such as, but not limited to, movement indicators, accumulated distances, successful passes, headers, and the like. The profile may further include a name or other unique identification of the object, date and time of last update, and so on. Each profile may be associated with a player such that the positions represents movements of the entity during the monitored time period. As a non-limiting example, the plurality of positions may represent the movement of a rugby player during a rugby match.

At optional S370, the generated profiles may be stored in, e.g., a database for subsequent viewing or other use. In an embodiment, S370 may include generating at least one report, each report including at least one set of a plurality of positions. The generated reports may be stored in the database.

It should be noted that steps S310 through S350 are described as being executed in series in the order shown in FIG. 3 merely for simplicity purposes and without limitation on the disclosed embodiments. The steps may be performed in parallel or in a different order without departing from the scope of the disclosure. For example, the sensor signals may be obtained before the images, one of the images or sensor signals may be analyzed before obtaining the other of the images or sensor signals, and the like.

Figure 4:
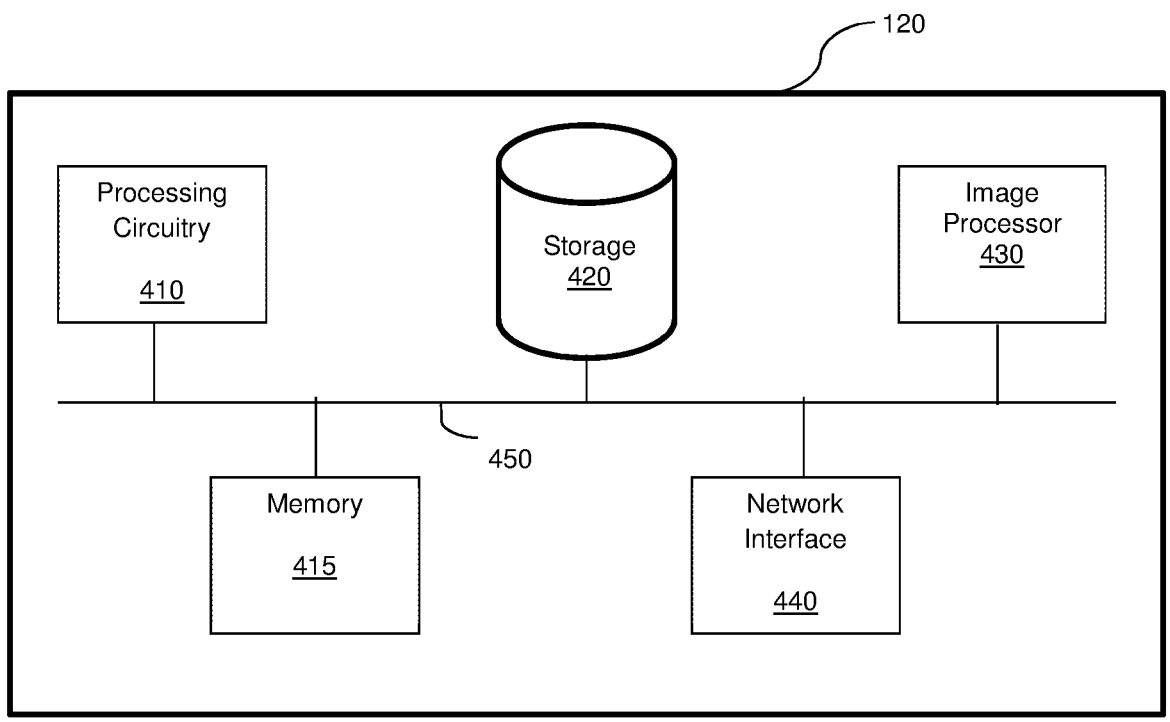
FIG. 4 is a schematic diagram of an entity tracker according to an embodiment.

FIG. 4 is an example schematic diagram of an object tracker 120 according to an embodiment. The object tracker 120 includes a processing circuitry 410 coupled to a memory 415, a storage 420, an image processor 430, and a network interface 440. In an embodiment, the components of the object tracker 120 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 415 may be volatile (e.g., RAM, etc.), non-volatile (e.g., ROM, flash memory, etc.), or a combination thereof. In one configuration, computer readable instructions to implement one or more embodiments disclosed herein may be stored in the storage 420.

In another embodiment, the memory 415 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to perform object tracking, as discussed hereinabove.

The storage 420 may be magnetic storage, optical storage, and the like, and may be realized, for example, as flash memory or other memory technology, CD-ROM, Digital Versatile Disks (DVDs), or any other medium which can be used to store the desired information.

The image processor 430 is configured to perform imaging analysis on images captured by cameras deployed in a monitored area. The image processor 430 may be configured to perform machine vision analysis to identify entities in captured images.

The network interface 440 allows the object tracker 120 to communicate with cameras, sensors, a user device, and the like, for the purposes of, for example, receiving images and sensor signals, sending movement data, and the like.

It should be understood that the embodiments described herein are not limited to the specific architecture illustrated in FIG. 4, and other architectures may be equally used without departing from the scope of the disclosed embodiments.

It should be noted that various embodiments described herein are discussed with respect to tracking movements of objects such as players and balls in areas such as fields during events such as sports games merely for example purposes and without limitation on the disclosed embodiments. The embodiments described herein are equally applicable to tracking other objects in other contexts such as, but not limited to, tracking positions and movements of dancers or actors in a performance, tracking movements of animals in a zoo, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for tracking movements of objects in a sports competition, comprising:
matching, after the sports competition, video captured by a plurality of cameras with sensory data captured by each of a plurality of tags during the sports competition, wherein each of the plurality of cameras is deployed in proximity to a monitored area, wherein each of the plurality of tags is disposed on an object of a plurality of monitored objects moving within the monitored area, at least one of the objects not being a person, wherein the matching further comprises:
time synchronizing among the plurality of tags;
frame synchronizing among the plurality of cameras; and
synchronizing the plurality of tags with the synchronized frames of the plurality of cameras;

determining, based on the matched video and sensory data, at least one performance profile for and associated with a person who is one of the monitored objects, wherein each performance profile is determined based on positions of at least two of the respective monitored objects moving within the monitored area during the sports competition as determined from the matched video and sensory data, wherein each performance profile contains at least one indication of an instance of a predefined, recognized success of performance in the sports competition of the person associated therewith that is combinable with at least one other instance of occurrence of such indication of predefined, recognized success of performance of the person; and storing the at least one performance profile for subsequent use in describing the associated person's performance in the sports competition.

2. The method of claim 1, wherein each of the plurality of tags includes at least one of: an accelerometer, a gyroscope, and a magnetometer.

3. The method of claim 1, wherein each of the plurality of tags does not include a global positioning system (GPS).

4. The method of claim 1, wherein the sensory data describes at least motion of respective monitored object on which at least one of the tags is disposed.

5. The method of claim 1, further comprising:
deterministically tracking positions of each monitored object in the monitored area.

6. The method of claim 5, wherein deterministically tracking positions of each monitored object in the monitored area further comprises:
tracking at least one first position of a tag-less object in the captured video; and
estimating at least one second position of the tag-less object, wherein each second position is estimated for a frame of the captured video in which the tag-less object does not appear, wherein the tag-less object is an object without one of the plurality of tags disposed thereon.

7. The method of claim 6, further comprising:
determining a 3-dimensional location of the tag-less object based on at least one of: triangulating distances among the plurality of cameras, a size of the tag-less object, and a trajectory of the tag-less object.

8. The method of claim 6, further comprising:
determining a three-dimensional location of the tag-less object based on at least one of: a single camera of the plurality of cameras in one location, an array of the plurality of cameras covering the field in one location, and using least two of the plurality of cameras from multiple locations.

9. The method of claim 6, wherein the tag-less object is a ball and the plurality of monitored objects include players participating in the sports competition.

10. The method of claim 1, further comprising:
estimating poses of the monitored objects; and
tracking the positions based on the estimated poses, wherein each estimated pose is any of: a 2-dimensional pose, and a 3-dimensional pose;
wherein each estimated pose is based on a skeleton of a respective monitored object that is a person that is developed based on the captured video.

11. The method of claim 10, wherein estimating poses of the monitored objects in the captured video further comprises:
computing a human skeleton of each monitored object that is a person; and
extracting at least one feature from each human skeleton, wherein the extracted at least one feature includes at least one property derived from a gait of the object.

12. The method of claim 10, further comprising:
determining, based on the sensory data, a first set of features related to a motion of each monitored object;
matching the determined first set of features to the respective estimated poses of each object; and
associating, based on the matching, an identifier of each object with a respective identifier of one of the plurality of tags, wherein the first set of features includes any one of: a property derived from a gait of each object, a direction of velocity of each object, and a heading vector of each object.

13. The method of claim 1, wherein each performance profile further includes at least one performance parameter for one of the plurality of monitored objects participating in the sports competition, wherein the at least one performance parameter of each performance profile includes at least one of: accumulated distance and statistics on a predefined set of game events.

14. The method of claim 13, further comprising:
analyzing the performance profiles generated for the plurality of monitored objects participating in the sports competition to provide at least one of: an injury prediction report, a performance prediction report, and a scouting data report.

15. The method of claim 1, further comprising:
calculating, for the at least one camera of the plurality of cameras, at least one of:
a three-dimensional location, a pan angle, a tilt angle, a row angle, and a lens zoom.

16. The method of claim 1, further comprising:
recognizing each object based on at least one unique property of the object.

17. The method of claim 16, wherein the recognition of each object is performed using any one of: artificial intelligence and deep learning.

18. The method of claim 16, wherein the at least one unique property of each object is at least one of: a gait property, a clothing texture, a skin property, a hair property, and a preferred location on the monitored area.

19. The method of claim 16, wherein the recognized objects include a tag-less object.

20. A non-transitory computer readable medium having stored thereon instructions for causing a processing circuitry to execute a process for tracking movements of objects in a sports competition, the process comprising:
matching, after the sports competition, video captured by a plurality of cameras with sensory data captured by each of a plurality of tags during the sports competition, wherein each of the plurality of cameras is deployed in proximity to a monitored area, wherein each of the plurality of tags is disposed on an object of a plurality of monitored objects moving within the monitored area, at least one of the objects not being a person, wherein the matching further comprises:
time synchronizing among the plurality of tags;
frame synchronizing among the plurality of cameras; and
synchronizing the plurality of tags with the synchronized frames of the plurality of cameras;
determining, based on the matched video and sensory data, at least one performance profile for and associated with a person who is one of the monitored objects, wherein each performance profile is determined based on positions of at least two of the respective monitored objects moving within the monitored area during the sports competition as determined from the matched video and sensory data, wherein each performance profile contains at least one indication of an instance of a predefined, recognized success of performance in the sports competition of the person associated therewith that is combinable with at least one other instance of occurrence of such indication of predefined, recognized success of performance of the person; and storing the at least one performance profile for subsequent use in describing the associated person's performance in the sports competition.

21. A system for tracking movements of objects in a sports competition, comprising:

a processing circuitry; and a memory, the memory containing instructions that, when executed by the processing circuitry, configure the system to:

match, after the sports competition, video captured by a plurality of cameras with sensory data captured by each of a plurality of tags during the sports competition, wherein each of the plurality of cameras is deployed in proximity to a monitored area, wherein each of the plurality of tags is disposed on an object of a plurality of monitored objects moving within the monitored area, at least one of the objects not being a person, wherein the matching further comprises:

time synchronize among the plurality of tags;

frame synchronize among the plurality of cameras; and synchronize the plurality of tags with the synchronized frames of the plurality of cameras;

determine, based on the matched video and sensory data, at least one performance profile for and associated with a person who is one of the monitored objects, wherein each performance profile is determined based on positions of at least two of the respective monitored objects moving within the monitored area during the sports competition as determined from the matched video and sensory data, wherein each performance profile contains at least one indication of an instance of a predefined, recognized success of performance in the sports competition of the person associated therewith that is combinable with at least one other instance of occurrence of such indication of predefined, recognized success of performance of the person; and store the at least one performance profile for subsequent use in describing the associated person's performance in the sports competition.

22. The system of claim 21, wherein each of the plurality of tags includes at least one of: an accelerometer, a gyroscope, and a magnetometer.

23. The system of claim 21, wherein each of the plurality of tags does not include a global positioning system (GPS).

24. The system of claim 21, wherein the sensory data describes at least motion of a respective monitored object on which at least one of the tags is disposed.

25. The system of claim 21, wherein the system is further configured to:

deterministically track positions of each monitored object in the monitored area.

26. The system of claim 25, wherein the system is further configured to:

track at least one first position of a tag-less object in the captured video; and estimate at least one second position of the tag-less object, wherein each second position is estimated for a frame of the captured video in which the tag-less object does not appear, wherein the tag-less object is an object without one of the plurality of tags disposed thereon.

27. The system of claim 26, wherein the system is further configured to:

determine a 3-dimensional location of the tag-less object based on at least one of:

triangulating distances among the plurality of cameras, a size of the tag-less object, and a trajectory of the tag-less object.

28. The system of claim 26, wherein the system is further configured to:

determine a three-dimensional location of the tag-less object based on at least one of: a single camera of the plurality of cameras in one location, an array of the plurality of cameras covering the field in one location, and using at least two of the plurality of cameras from multiple locations.

29. The system of claim 26, wherein the tag-less object is a ball and the plurality of monitored objects include players participating in the sports com petition.

30. The system of claim 21, wherein the system is further configured to:

estimate poses of the monitored objects; and track the positions based on the estimated poses, wherein each estimated pose is any of: a 2-dimensional pose, and a 3-dimensional pose; and wherein each estimated pose is based on a skeleton of a respective monitored object that is a person that is developed based on the captured video.

31. The system of claim 30, wherein the system is further configured to:

compute a human skeleton of each monitored object that is a person; and extract at least one feature from each human skeleton, wherein the extracted at least one feature includes at least one property derived from a gait of the object.

32. The system of claim 30, wherein the system is further configured to:

determine, based on the sensory data, a first set of features related to a motion of each monitored object;

match the determined first set of features to the respective estimated poses of each object; and associate, based on the matching, an identifier of each object with a respective identifier of one of the plurality of tags, wherein the first set of features includes any one of: a property derived from a gait of each object, a direction of velocity of each object, and a heading vector of each object.

33. The system of claim 21, wherein each performance profile further includes at least one performance parameter for one of the plurality of monitored objects participating in the sports competition, wherein the at least one performance parameter of each performance profile includes at least one of: accumulated distance and statistics on a predefined set of game events.

34. The system of claim 33, wherein the system is further configured to:

analyze the performance profiles generated for the plurality of monitored objects participating in the sports competition to provide at least one of: an injury prediction report, a performance prediction report, and a scouting data report.

35. The system of claim 21, wherein the system is further configured to:

calculate, for the at least one camera of the plurality of cameras, at least one of: a three-dimensional location, a pan angle, a tilt angle, a row angle, and a lens zoom.

36. The system of claim 21, wherein the system is further configured to:

recognize each object based on at least one unique property of the object.

37. The system of claim 36, wherein the recognition of each object is performed using any one of: artificial intelligence and deep learning.

38. The system of claim 36, wherein the at least one unique property of each object is at least one of: a gait property, a clothing texture, a skin property, a hair property, and a preferred location on the monitored area.

39. The system of claim 36, wherein the recognized objects include a tag-less object.

\* \* \* \* \*